Patented Apr. 27, 1948

2,440,467

UNITED STATES PATENT OFFICE 2,440,467

SULFUR CONTAINING COATING COMPOSITIONS

Vincent J. Frilette, New York, N. Y., assignor to Ridbo Laboratories, Inc., Paterson, N. J., a corporation of New Jersey No Drawing. Application May 20, 1944, Serial No. 536,639

7 Claims. (Cl. 106—228)

This invention relates to coating compositions and to the preparation thereof, the invention being particularly concerned with those types of coating compositions in which the film-forming ingredients, in whole or at least in substantial part, comprise one or more ingredients which dry by virtue of oxidation at room temperature or temperatures not extensively raised above room temperature. Typical examples of such film-forming ingredients are the drying and semi-drying fatty oils.

The principal object of the invention is to improve certain characteristics and properties of coating compositions of the above types, especially paints and varnishes, the improvement being outstanding with respect to alkali, soap, and water resistance. A further object of the invention is improvement in the flexibility of the dried coating films.

Briefly stated, the invention contemplates effecting the improvements referred to above by dispersing in coating compositions of the character mentioned relatively small quantities of elementary sulfur, it being of importance that the sulfur remain in elementary form. In view of this, in a typical case, the varnish or paint base is subjected to all of the desired or required treatment steps involving relatively high temperature, and thereafter a small percentage of fine sulfur particles are dispersed in the prepared vehicle, as by grinding on a paint mill in the general manner employed for incorporation of pigments.

It has long been recognized that film-forming ingredients, such as fatty oils which dry essentially by oxidation, inherently have poor alkali and water resistance. Attempts have been made to overcome this disadvantage in a variety of different ways, some of which require expensive ingredients or handling technique. Quite commonly, in the varnish-makers' trade, resins have been incorporated in the paint or varnish base to secure oleoresinous coatings which are somewhat more resistant to alkalies and water than are the oils by themselves. However, this attempt to solve the problem has been subject to certain disadvantages, especially the fact that oleoresinous blends frequently result in the loss of other desired properties, such as light color, flexibility and good aging characteristics.

By employing small percentages of elementary sulfur dispersed in the coating composition I have found that the alkali, soap and water resistance is greatly improved. This effect is secured by dispersing elementary sulfur in a drying oil alone, and also by dispersing sulfur in an oleoresinous varnish or paint base, or in a completely prepared coating composition such as a paint incorporating a pigment and an oleoresinous vehicle. Moreover, the improvement of the present invention may be secured without appreciably adversely influencing other properties either of the coating compositions or of the dried film. In fact, in many instances no adverse influence is observable.

In view of the foregoing, the invention makes possible, by simple dispersion of elementary sulfur, to improve even the best formulations now known to the art, with respect to alkali and water resistance. On the other hand coating compositions prepared according to formulations heretofore considered inferior with respect to alkali and water resistance may, according to the invention, be very extensively improved, so as to be equal or superior to better formulations, such as those incorporating specially prepared resins, and this advantage may be secured without adversely influencing other characteristics of the film.

In many cases, according to the invention, it is possible to secure a coating composition for a given purpose, having superior alkali and water resistance in comparison with compositions heretofore employed for that purpose, while at the same time effecting a saving in cost with respect to materials or handling or both.

Carrying my invention into practice is exceedingly simple, since it merely consists in the physical incorporation and dispersion of small amounts of sulfur in the coating material at any time subsequent to treatment at high temperature and prior to application of the coating material to a surface. The incorporation and dispersion may be effected in any one of a variety of ways. For example, after preparation of a varnish or paint vehicle a small percentage of sulfur may be stirred in. The sulfur may be introduced along with pigments or driers, or it may be mixed or ground with a constituent or portion of the vehicle to form a master batch which is subsequently mixed with the remainder of the composition.

It is of importance to observe the following points in practicing the invention. First the continued presence of the sulfur in elementary form should be assured, and in view of this no prolonged heat treatment above about 100° C. should be applied after incorporation of the sulfur, in order to avoid reaction of the sulfur with the oil or any other ingredient of the composition.

Employment of sulfur of small particle size is also important, and in general it appears that the smaller the particle size the better the effect. I believe this is because of increase in total surface area which the sulfur presents to the constituents of the vehicle. Fine particle size is also of importance from another standpoint, i. e., reduction of sedimentation and turbidity. The extent of or tendency toward sedimentation will of course be influenced by the viscosity of the material to which the sulfur is being added, but, in most cases, I have found that all or most of the sulfur particles being added should preferably be of particle size less than about 10 microns, and preferably less than 5 microns.

With respect to the quantity of sulfur to be employed, this will also vary somewhat depending upon a number of other factors, such as the nature of the film-forming ingredients, but desirably the quantity of sulfur employed is less than that which will result in any substantial coloring. In the preferred practice of the invention, the quantity of sulfur employed is less than that which will result in any substantial turbidity or coloring of a film deposited from an unpigmented oil or paint vehicle, such as an oleoresinous varnish. This is of advantage and importance since a paint vehicle may be prepared to incorporate the elementary sulfur, and then the vehicle may either be used clear, i. e., as a varnish, or may alternatively be pigmented, even with white or pastel pigments, and whether used clear or pigmented, the maker is assured that films deposited from the final composition will not be discolored.

With the foregoing in mind, for most purposes the quantity of sulfur should not be greater than about 2% by weight, and preferably below about 1%, calculated on the weight of the non-volatile content of the composition, i. e., all of those ingredients which are actually deposited to form the final film. It will be understood, of course, that the sulfur may, if desired, be incorporated in a pigmented paint even after the pigment is ground in.

Employment of sulfur below about 2% and especially below 1% is also of advantage in avoiding some retardation of drying particularly with unpigmented coating compositions.

Extensive improvement in characteristics of the composition is usually secured by the employment of quantities of sulfur even smaller than those above mentioned, sometimes even as little as about .05% being sufficient to cause noticeable improvement. It should be mentioned that the quantity of sulfur to secure a given effect with respect to alkali or water resistance will vary somewhat in accordance with the fineness of particle size and also the extent of surface area.

Another consideration to be kept in mind with respect to the quantity of sulfur is that with oils, paint vehicles or paints of types heretofore having inferior alkali resistance, more than a proportionate increase in the percentage of sulfur is sometimes required to secure a given improvement, than is the case with oils, vehicles or paints initially having superior alkali resistance.

The sulfur may be derived from any of the known sources. Lump sulfur may be crushed to the desired fineness, or, flowers of sulfur may be employed, as by grinding with a vehicle ingredient on a paint mill. However, it is of especial advantage to employ sulfur, the particle size of which has previously been reduced below about 5 microns by mechanical or other known treatments, since sulfur of this fineness apparently has greater exposed surface area and I have found that it also displays greater resistance to sedimentation. Still further, the clarity of the compositions is particularly good when employing sulfur of very small particle size.

The invention may be applied to coating compositions of a variety of types. It may be applied to a drying oil alone, to an unpigmented vehicle or varnish, to a pigmented paint, even of the emulsion type. It may also be employed in connection with impregnating compounds and with lacquers incorporating drying oils, etc. In short, the invention is applicable to any coating composition in which the film-forming ingredients, in whole or in substantial part, consist of materials which dry by oxidation. The invention, therefore, is especially applicable to those fatty oils which are of the drying or at least of the semi-drying types. Typical examples of drying oils are linseed oil, tung oil and dehydrated castor oil. Typical examples of semi-drying oils are soya bean oil and menhaden oil. The invention may also be used with various types of synthetic and especially treated oils and also with certain resins such as drying oil-modified alkyds.

The extent of improvement in alkali and water resistance is outstanding, the improvement in many cases being such that in tests a dried coating film containing elementary sulfur will withstand subjection to alkali for a period many times as long as a comparative dried coating film not containing the sulfur. In the case of pigmented coating compositions it will be found that the sulfur-containing films deposited will usually withstand test at least several, for example three to six times, as long as a film made from the same composition except for the omission of the sulfur. In the case of certain oils alone, the improvement is so marked that in many cases the sulfur-containing film will withstand test up to 150 times as long as a film made from the same oil not containing sulfur. The quantity required for this purpose, particularly when using sulfur of very fine particle size and especially below about 5 microns, is so small that the clarity and color even of an unpigmented vehicle or oil film is usually not perceptibly altered.

EXAMPLES

In examples given below the invention is illustrated as applied to various drying oils per se and also to a number of different varnishes or paint vehicles as well as to paints.

In all of the examples below driers were employed. In each case these driers comprised 0.05% cobalt metal and 0.40% lead metal (added as naphthenates) based on the weight of the oil present.

For purposes of determining improvement in alkali resistance of the films deposited from the compositions of the examples, films of 0.0015 inch thickness were applied to glass test panels by means of a Byrd film applicator. These films were permitted to age for about one week and were then immersed in a 1½% aqueous solution of sodium hydroxide. In each example the time for disintegration of the film was noted.

COMPARATIVE EXAMPLES 1–6

In this group of examples a heat polymerized linseed oil was employed and different amounts of sulfur dispersed in batches of the oil, as is indicated in Table I below. The sulfur added had an average particle size of about 3 microns. The sulfur was preliminarily mixed and ground with an equal weight of heat bodied linseed oil for convenience in securing dispersion in the oil. This sulfur-linseed oil paste was employed not only in Examples 1 to 6 but also in certain others mentioned herebelow, in all of which the percentage figures designate the actual amount of sulfur added.

The table below also shows, for purposes of comparison, the alkali resistance of the same heat polymerized linseed oil without the addition of sulfur.

Table I
HEAT POLYMERIZED LINSEED OIL

| Example No. | Per cent Sulfur | Time for Alkali Disintegration, hours |
|---|---|---|
| A | None | 0.2 |
| 1 | 0.1 | 0.3 |
| 2 | 0.2 | 0.6 |
| 3 | 0.3 | 1.0 |
| 4 | 0.4 | 2.1 |
| 5 | 0.5 | 3.8 |
| 6 | 1.0 | 30.0 |

It is noted that notwithstanding the fact that linseed oil alone is ordinarily considered as having quite poor alkali resistance, nevertheless even quite small percentages of elementary sulfur result in a marked improvement. The drying characteristics of the films of Examples 1-6 were not perceptibly altered as compared with the linseed oil containing no sulfur.

COMPARATIVE EXAMPLES 7-9

In this group of examples tung oil was employed and varying quantities of sulfur of the same particle size and introduced in the same manner as that referred to above under Examples 1-6 were dispersed and the films prepared and tested as above described. The results are indicated in Table II just below.

Table II
HEAT POLYMERIZED TUNG OIL

| Example No. | Per cent Sulfur | Time for Alkali Disintegration, hours |
|---|---|---|
| B | None | 2.5 |
| 7 | 0.1 | 14.0 |
| 8 | 0.5 | 42.0 |
| 9 | 1.0 | over 50 |

Although tung oil is ordinarily considered as having better alkali resistance than most of the drying oils, it will be noted that even small percentages of elementary sulfur very extensively improve the alkali resistance of this oil.

No perceptible alteration in drying characteristics was noted with the sulfur-containing tung oil films, as compared with the tung oil film containing no sulfur.

Attention is called to the fact that even as little as 0.5% of sulfur added to the heat bodied linseed oil of Example 5 above improves the alkali resistance of the linseed oil well beyond that of tung oil containing no sulfur.

EXAMPLE 10

In this example 0.1% of sulfur was dispersed in unbodied dehydrated castor oil, the sulfur being added according to Examples 1-6.

After aging of a film for one week the dried film was subjected to the alkali test above described and the film disintegrated in about 0.50 hour, which compared with a disintegration time of about 0.25 hour for a film made from the same oil (plus driers) without sulfur.

EXAMPLE 11

In this example low viscosity lightly air blown raw soya bean oil was used. Here again a portion of the linseed oil-sulfur master batch of Examples 1-6 was added in order to give 0.5% sulfur.

Alkali testing of a film aged for one week indicated a disintegration time of 1.10 hours, which compared with a disintegration time of 0.08 hour for the same soya bean oil (plus driers) without the presence of sulfur.

EXAMPLE 12

In this example air blown linseed oil having a viscosity of 36 poises was employed, and about 12.5% of toluene was added to reduce the viscosity.

A portion of the linseed oil-sulfur master batch of Examples 1-6 was added to the above composition, to give 1.00% of sulfur based on the weight of the diluted oil.

An aged film required immersion in the alkali test solution for 0.90 hour for disintegration, which compared with 0.16 hour for the same composition except for the omission of the sulfur.

EXAMPLE 13

A 50% solids 20-gallon length modified maleic-linseed oil varnish was used in this example. The sulfur used in this example was prepared by grinding flowers of sulfur with the above mentioned driers, the amount being 0.3%, calculated on the weight of the non-volatile ingredients.

An aged film required 4.00 hours for disintegration when immersed in the alkali test solution, which compared with a disintegration time of 0.83 hour for the same composition without sulfur.

EXAMPLE 14

A 33-gallon length varnish was prepared as follows:

To 2,400 gms. of heavy bodied linseed oil were added 912 gms. of ester gum B, this mixture being heated at 295° C. for 4.5 hours. After cooling to 200° C., the batch was cut to 50% solids with mineral spirits. The viscosity of this varnish was 1.9 poises. Cobalt and lead naphthenate driers were added in quantities yielding 0.05% cobalt metal and 0.40% lead metal on the weight of the oil present.

0.45% of sulfur, calculated on the weight of the non-volatile ingredients was added and dispersed in the varnish. This sulfur was prepared by milling flowers of sulfur on a paint mill with 50% of heat bodied linseed oil, thereby forming a linseed oil-sulfur paste having an average particle size of 5.2 microns, very few of the particles exceeding 10 microns.

An aged film required 4.2 hours for the disintegration in the alkali test solution, which compared with a disintegration time of 2.0 hours for the same varnish composition without any sulfur.

An aged film deposited from the composition of this example was also subjected to a soap test to determine time for disintegration. According to this test the film was immersed in a 1% aqueous solution of a flake soap commonly available on the market ("Ivory" flakes manufactured by Procter and Gamble), the solution being maintained at 75–80° C. The film containing sulfur required 3.6 hours for disintegration which compared with 1.4 hours for a film deposited from the same composition without any sulfur.

EXAMPLE 15

In this example a white enamel paint was prepared using a 20-gallon modified maleic resindehydrated castor oil vehicle containing 50% titanium dioxide, the final paint having 75% non-volatile content.

To this paint 1.33% of sulfur was added on the weight of the total non-volatile constituents, the sulfur being introduced in accordance with Examples 1–6.

An aged film required 7 hours for disintegration in the alkali test solution, which compared with 2.25 hours for the same paint without any sulfur.

EXAMPLE 16

This example illustrates application of the invention to an emulsion type paint.

The white enamel of Example 15 was here used in emulsion form. To this enamel 1% of the sodium salt of sulfated lauryl alcohol was added and then 2 parts weight of the enamel were emulsified with 1 part of water. 1.5% of sulfur was added according to Examples 1–6 to a batch of the emulsified paint, the percentage being calculated on a basis ignoring the presence of the water, i. e., on the weight of the non-volatile content. When calculated on the basis of the non-volatile content, exclusive of pigment, the percentage will be seen to have been 3%, since the pigment comprised 50% of the non-volatile content. Upon subjection of an aged film prepared from the emulsion to the alkali test above referred to, 9.6 hours were required for disintegration, which compared with 5.3 hours for a film prepared from an emulsion of the same composition without any sulfur.

EXAMPLE 17

This example demonstrates improvement of flexibility of films deposited from compositions prepared according to the present invention.

A 33-gallon length ester gum B varnish was here used, of composition similar to Example 14 above. The kauri reduction test was used, this test being carried out according to Gardner except that the films were air dried for 48 hours, rather than baked, in order to avoid reaction of the elementary sulfur with other ingredients of the composition. To one portion of the varnish 0.2% of elementary sulfur was added and dispersed, according to Examples 1–6 above, and to another portion 0.6% of sulfur was added, on the weight of the non-volatile content of the composition.

After air drying films deposited from the above compositions the film containing 0.2% of sulfur showed a kauri reduction of 130%, while the film containing 0.6% of sulfur showed a kauri reduction of 220%. This compared with a kauri reduction of 90% for an air dried film deposited from the same composition except for the omission of the sulfur. The foregoing indicates marked improvement in flexibility and it may be mentioned that the above figures also indicate improved aging qualities of the sulfur containing films, as compared with the film not containing sulfur.

I claim:

1. A varnish comprising a member of the class consisting of drying oils and semi-drying fatty oils, a resin constituent dissolved in the oil, and from .05 to 2% of well dispersed elemental sulfur calculated on the total non-volatile constituents of the varnish.

2. A paint comprising a pigment constituent and a vehicle constituent, said vehicle constituent comprising a member of the class consisting of drying oils and semi-drying fatty oils and particles of elemental sulfur dispersed in the oil, said sulfur being present in an amount not exceeding 3% calculated on the weight of the oil and oil-soluble non-volatile ingredients in the absence of pigment, said amount of sulfur being in no case less than .05% or more than 2% of the total non-volatile constituents of the paint.

3. A liquid coating composition adapted to form a dried film comprising a constituent capable of forming a dried film upon oxidation, said constituent being a member of the class consisting of: (a) drying fatty oils; (b) semi-drying fatty oils; (c) mixtures of drying and semi-drying fatty oils, a resin dissolved in said constituent, and elemental sulfur in finely divided form well dispersed in the oil in an amount not exceeding 3% calculated on the weight of the oil and ingredients dissolved therein, said amount of sulfur being in no case less than .05% or more than 2% by weight of the total non-volatile ingredients of the coating composition.

4. A liquid coating composition adapted to form a dried film comprising a constituent capable of forming a dried film upon oxidation, said constituent being a member of the class consisting of: (a) drying fatty oils; (b) semi-drying fatty oils; (c) mixtures of drying and semi-drying fatty oils, and elemental sulfur in the form of finely divided particles well dispersed in the said constituent in an amount not exceeding 3% calculated on the weight of the said constituent, said amount of sulfur in no case being less than .05% or more than 2% of the total non-volatile ingredients of the coating composition.

5. A coating composition according to claim 1 in which at least the major portion of the sulfur particles are of particle size less than about 10 microns.

6. A coating composition according to claim 1 in which at least the major portion of the sulfur particles are of particle size less than about 5 microns.

7. A coating composition according to claim 1 in which the content of sulfur is from about 0.1% to about 1% calculated on the weight of the non-volatile content of the composition.

VINCENT J. FRILETTE.

REFERENCES CITED

The following references are of record in the file of this patent:

UNITED STATES PATENTS

| Number | Name | Date |
| --- | --- | --- |
| 149,074 | Sevin | Mar. 31, 1874 |
| 158,094 | Lee | Dec. 22, 1874 |
| 315,885 | Baggaley | Apr. 14, 1885 |
| 1,463,884 | Gardner | Aug. 7, 1923 |
| 2,133,493 | Wasson | Oct. 18, 1938 |
| 2,199,710 | Muskat | May 7, 1940 |